United States Patent
Noura (10) Patent No.: US 11,465,742 B2
(45) Date of Patent: Oct. 11, 2022

(54) METHOD FOR SHADING FIXED TRACTS OF LAND USING FLYING OBJECTS

(71) Applicant: Kosuke Noura, Tokyo (JP)

(72) Inventor: Kosuke Noura, Tokyo (JP)

( * ) Notice: Subject to any disclaimer, the term of this patent is extended or adjusted under 35 U.S.C. 154(b) by 341 days.

(21) Appl. No.: 16/754,070

(22) PCT Filed: Oct. 9, 2018

(86) PCT No.: PCT/JP2018/037627
§ 371 (c)(1),
(2) Date: Apr. 6, 2020

(87) PCT Pub. No.: WO2019/073984
PCT Pub. Date: Apr. 18, 2019

(65) Prior Publication Data
US 2020/0324896 A1    Oct. 15, 2020

(30) Foreign Application Priority Data
Oct. 10, 2017   (JP) .............................. JP2017-206616

(51) Int. Cl.
*B64C 39/02* (2006.01)
*B64C 13/18* (2006.01)
(Continued)

(52) U.S. Cl.
CPC ............ *B64C 39/024* (2013.01); *B64C 13/18* (2013.01); *B64C 27/08* (2013.01); *G05D 1/0027* (2013.01);
(Continued)

(58) Field of Classification Search
CPC ....... B64C 39/024; B64C 13/18; B64C 27/08; B64C 2201/108; B64C 2201/127; B64C 2201/141; B64C 2201/146; B64C 2201/027; B64C 2201/066; B64C 2201/12; B64C 2201/143; B64C 2201/145; B64C 19/02; B64C 39/02; G05D 1/0027;
(Continued)

(56) References Cited

U.S. PATENT DOCUMENTS 10,719,289 B2 * 7/2020 Di Federico ............ G09G 5/006
11,209,837 B2 * 12/2021 Huang .................... G01S 19/45
(Continued)

FOREIGN PATENT DOCUMENTS

CN        106444816 A      2/2017
CN        206012955 U      3/2017
(Continued)

OTHER PUBLICATIONS

Search Report dated Mar. 2, 2022 for Chinese Patent Application No. 201880065744.8.
(Continued)

*Primary Examiner* — Yonel Beaulieu (57) ABSTRACT

This invention is to provide a method to entirely and effectively shade fixed tracts of land, such as school yard or athletics stadium, etc., with no roof, pole to support roof, or the like. To fix a sheet to multiple flying objects so that such sheet forms a fixed size of surface and make such flying objects fly in accordance with flying positions (including heights) decided based on elements, such as positions of the sun, etc.

2 Claims, 12 Drawing Sheets

(51) Int. Cl.
*G05D 1/00* (2006.01)
*B64C 27/08* (2006.01)

(52) U.S. Cl.
CPC .. *B64C 2201/108* (2013.01); *B64C 2201/127* (2013.01); *B64C 2201/141* (2013.01); *B64C 2201/146* (2013.01)

(58) Field of Classification Search
CPC .......... G05D 1/104; G05D 1/00; A01G 15/00; B64D 1/22; B64D 3/00
See application file for complete search history.

(56) References Cited

U.S. PATENT DOCUMENTS

| | | | |
|---|---|---|---|
| 2005/0010365 A1* | 1/2005 | Chapman | G01S 19/14 702/3 |
| 2006/0266950 A1* | 11/2006 | Acevedo | G01S 3/7861 250/372 |
| 2017/0055433 A1* | 3/2017 | Jamison | G05D 1/104 |
| 2018/0027772 A1* | 2/2018 | Gordon | G05D 1/104 |
| 2020/0369385 A1* | 11/2020 | Thörn | G08G 5/0069 |
| 2021/0300553 A1* | 9/2021 | Exner | G06Q 10/083 |
| 2021/0300554 A1* | 9/2021 | Bergkvist | G08G 5/0091 |
| 2021/0304130 A1* | 9/2021 | Isberg | G06Q 10/0833 |
| 2022/0024613 A1* | 1/2022 | Kukharev | H02J 50/001 |

FOREIGN PATENT DOCUMENTS

| | | |
|---|---|---|
| GB | 2504132 A | 1/2014 |
| JP | 2008212421 A | 9/2008 |
| JP | 4666539 B2 | 4/2011 |
| JP | 2014523358 A | 9/2014 |
| JP | 2015048025 A | 3/2015 |
| JP | 2017056898 A | 3/2017 |
| WO | 2013077557 A1 | 5/2013 |

OTHER PUBLICATIONS

International Search Report dated Dec. 4, 2018 for PCT Application No. PCT/JP2018/037627.
"The time has come to be able to put up umbrella without using hands!," https://www.sankei.com/premium/news/160618/prm1606180004-n1.html The Sankei News, Jun. 19, 2016.

* cited by examiner

METHOD FOR SHADING FIXED TRACTS OF LAND USING FLYING OBJECTS

BACKGROUND OF THE INVENTION

This invention is for shading fixed tracts of land using flying objects.

Before this invention, there was a technology for a protection device such as a drone to prevent a moving object such as a person from getting wet in the rain, etc. by such device flying above such moving object and following it.

PRIOR ART DOCUMENTS

Japanese Unexamined Patent Application Publication No. 2015-48025; and
Japanese Unexamined Patent Application Publication No. 2017-56898.

BRIEF SUMMARY OF THE INVENTION

Problems to be Solved by the Invention

Before this invention, there was no method to entirely and effectively shade fixed tracts of land such as school yard or athletics stadium, etc. where there was no roof, pole to support roof, or the like.

Also, before this invention, there was a technology for a device to shade a moving object such as a person by such device following it, but, for such technology, there was a problem that it obstructs purposes of athletes to be covered in the events where, as in soccer or rugby:
  (i) Objects to be covered move quickly and movements of such objects are difficult to predict; or
  (ii) Covering objects to be covered by flying right above them interferes with such games.

Further, as with the previous technology, in the case of covering a specific person by flying right above it, there was a problem of congestion of or view obstruction by flying objects if many people are in the same place like in an outside live music event.

This invention is to provide a method to entirely and effectively shade fixed tracts of land such as school yard or athletics stadium, etc. where there is no roof, pole to support roof, or the like.

Also, this invention is to provide a method to continuously shade objects to be covered, not preventing such objects' movements also in the cases where, as described above:
  (i) Objects to be covered move quickly and movements of such objects are difficult to predict; or
  (ii) Covering objects to be covered by flying right above them interferes with movements of such objects.

Further, this invention is to provide a method to continuously shade objects, which are to be covered, not resulting in congestion of or view obstruction by flying objects also in the cases where many people are in the same place like in an outside live music event.

Means for Solving the Problems

A sheet which prevents or mitigates ultraviolet and solar heat is fixed to (i) bottoms or (ii) sides of multiple objects which can fly so that such sheet forms a fixed size of surface.

Flying positions, including heights, of each of such multiple flying objects are decided based on any of (i) latitude longitude, date and time of places at which each of such multiple flying objects is, (ii) size of a sheet, and (iii) size and place of a land ultraviolet and solar heat to which is to be prevented or mitigated.

Each of multiple flying objects with such sheet flies in accordance with the information of such decided flying positions (including heights) by:
  (i) Human control of a mobile device separate from such multiple flying objects;
  (ii) Automatic control of a mobile device which is separate from such multiple flying objects and into which such information has been input in advance; or
  (iii) Self-control with such information input in advance.

Effects of the Invention

This invention makes it possible to prevent or mitigate ultraviolet or solar heat to a land, at which an object or objects to be covered is/are, not obstructing purposes of such object(s) or not making congestion of or view obstruction by flying objects, even if:
  (i) Such object(s) move quickly and movements of such object(s) are difficult to predict;
  (ii) Covering such object(s) by flying right above it/them interferes with movements of such object(s) or views of people near such object(s); or
  (iii) Many people are in the same place.

Further, this invention makes it possible to prevent or mitigate ultraviolet or solar heat to a land, at which an object or objects to be covered is/are, continuously, regardless of movements of the sun, by a surface formed by a sheet changing its positions (including heights) depending on positions of the sun which change as time proceeds.

DETAILED DESCRIPTION OF THE INVENTION

Figure 1:
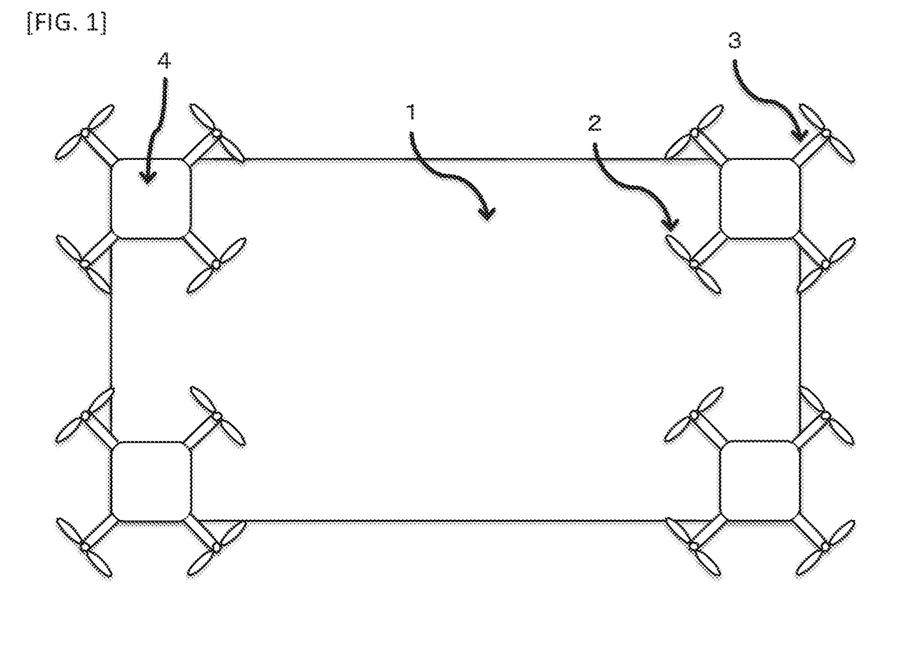
FIG. 1 is a figure of a view from the above of an example of a structure of a flying object in the first form to execute this invention.

FIG. 1 is a figure of a view from the above of an example of a structure of a flying object to execute this invention in the first form.

Such flying object has a body part serving main features such as driving and controlling, etc. and each two-blade propeller on each top of four arms which extend horizontally from such body part so that such flying object can fly by driving such propellers.

In the first form to execute this invention, a part of a sheet is fixed directly to the bottom of a body part of a flying object.

By multiple flying objects with the same structure flying, a sheet, parts of which are fixed to each flying object, constitutes, as a whole, a surface against a land.

In order to maximize the size of the surface formed by such sheet when such flying objects fly, it is preferable to fix each of four corners of a sheet to each of flying objects.

Figure 2:
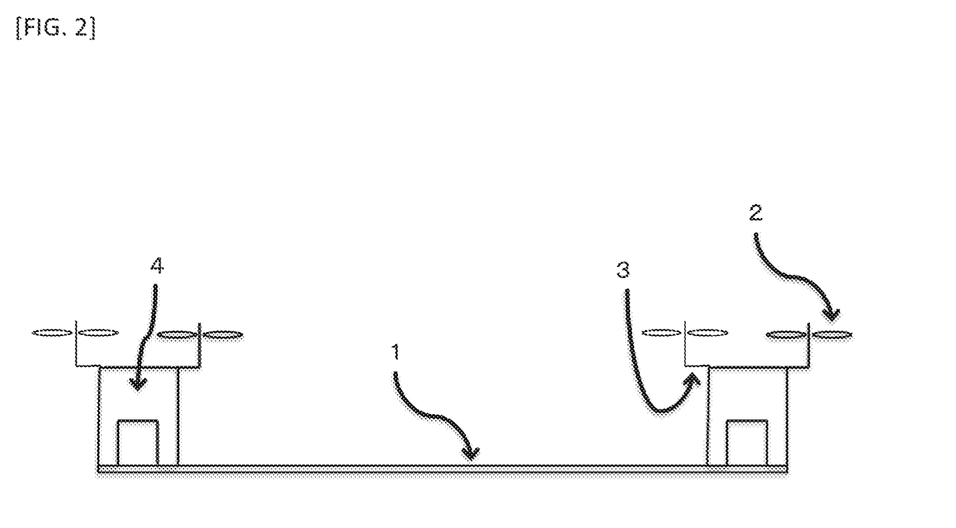
FIG. 2 is a figure of a view from the side of an example of a structure of a flying object in the first form to execute this invention.

FIG. 2 is a figure of a view from the side of an example of a structure of a flying object to execute this invention in the first form.

Under this condition, and by having each flying object (i) fly vertically and hover at the designated height or (ii) fly, whether vertically or not, with such flying object keeping the same distance each other throughout the takeoff and the fly thereafter and hover at the designated position (including height), it is possible to form a fixed size of surface with a sheet in the air and create a fixed size of shade on a land under such sheet.

For clarity, with respect to a material of the sheet, a sheet which prevents or mitigates sunlight is generally usable, but a mesh sheet which not only prevents or mitigates sunlight but also breathes is preferable.

Because (i) it is less affected by wind, and (ii) it is preferable not to disturb airflow around a flying object as much as possible in order to keep normal ability to fly of such flying object.

Also, there is a method to fix a flying object to a sheet so that they constitute the same surface.

Figure 3:
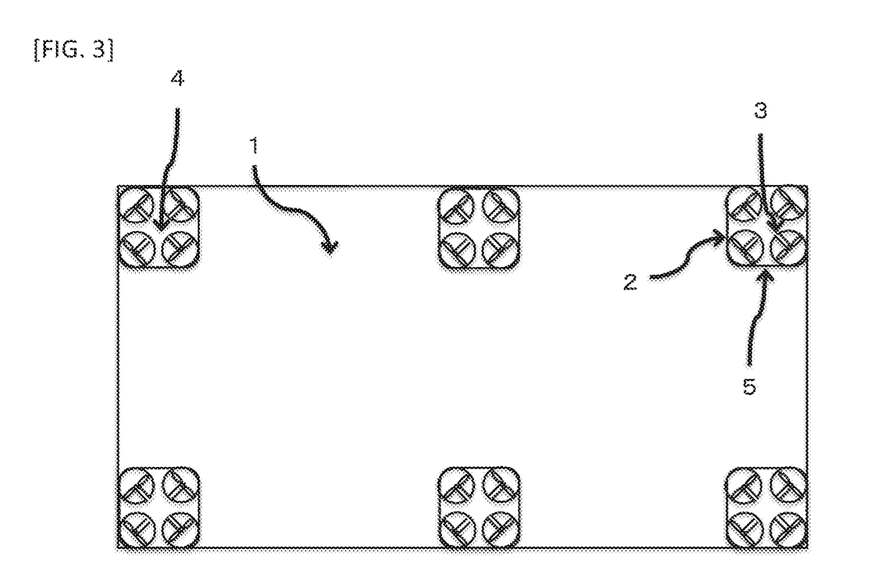
FIG. 3 is a figure of a view from the above of an example of a structure of a flying object in the second form to execute this invention.
Figure 4:
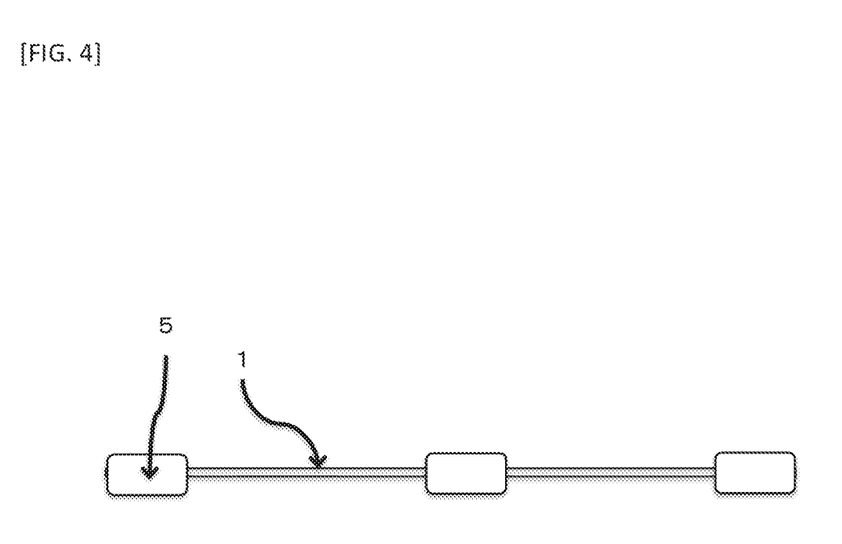
FIG. 4 is a figure of a view from the side of an example of a structure of a flying object in the second form to execute this invention.

While FIG. 3 is a figure of a view from the above of an example of a structure of a flying object in the second form to execute this invention, FIG. 4 is a figure of a view from the side of an example of such structure.

In this example of such structure, as shown in FIG. 3, there are (i) four arms which extend horizontally from the body part including controlling part, etc., (ii) each two-blade propeller on the top of each of such four arms, and (iii) a surrounding part around such body part and propellers.

As shown in FIG. 4, a surrounding part of each flying object is connected to a sheet so that such surrounding part and such sheet constitute the same surface.

This form to execute this invention makes flying more stable because, in such form, a flying object and a sheet are on the same surface.

The more flying objects are incorporated into a sheet, the more stable the flying is.

Figure 5:
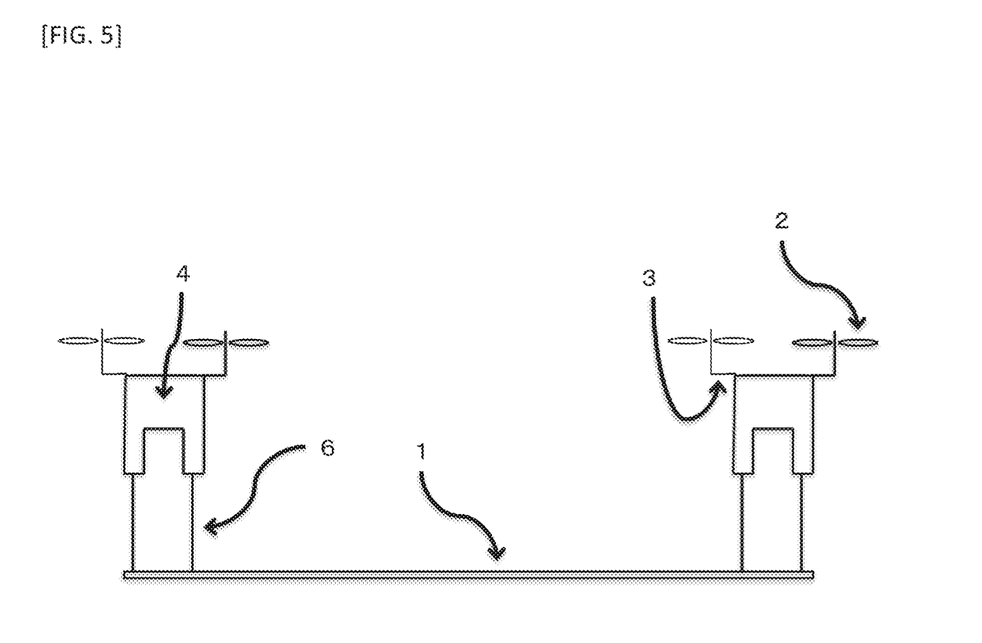
FIG. 5 is a figure of a view from the side of an example of a structure of a flying object in the third form to execute this invention.

FIG. 5 is a figure of a view from the side of an example of a structure in the third form to execute this invention.

The bottoms of flying objects are connected to parts of a sheet with string-like or pole-like materials.

For other portions, the same explanations in FIG. 1 and FIG. 2 apply.

Figure 6:
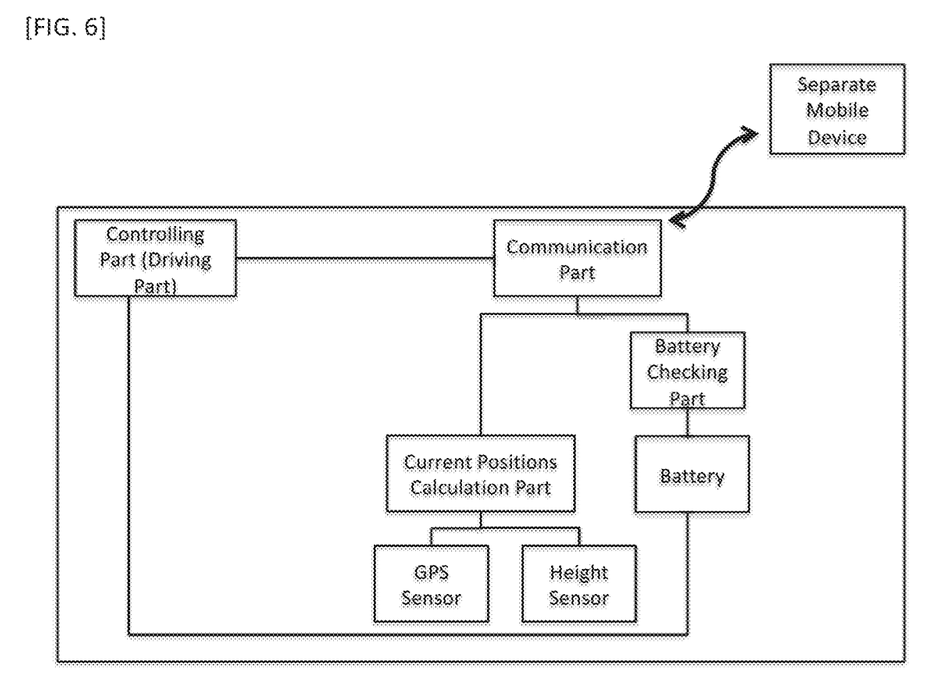
FIG. 6 is a figure to show an example of a structure of an inside of a flying object in the first, second, and third forms to execute this invention.

FIG. 6 shows an example of a structure of an inside of a flying object in the above first, second and third forms.

A controlling part (driving part), including motor, is connected to a communication part and a battery, and such communication part manages communications with such controlling part and communications with a mobile device separate from each flying object.

Such communication part is, in a flying object, connected to (i) a part for calculation of current positions and (ii) a part for battery-checking, and receives (a) information of current positions (including heights) from such calculation part including sensors for GPS and height and (b) information of remaining battery level from such part for battery-checking connected to a battery part.

Such communication part transmits the information of these to such separate mobile device which a controlling person has, and such separate mobile device shows such information on a screen of such device.

Such controlling person compares information of current positions (including heights) shown on such screen with positions designated by calculation mentioned below, and, if there is any difference between them, transmits directions to a communication part of each flying object through a separate mobile device so that a current position (including height) of each flying object matches designated positions (including heights).

When a communication part receives such directions, it then transmits, to a controlling (driving) part, directions for driving condition, and each flying object changes its flying position (including height) to a designated position (including height) accordingly.

A method to calculate such designated positions is as follows.

First, according to page 6 and thereafter in Nisho-Keikaku-Kenkyukai (ed.), *Nisho-Keikaku Databook* (Shokokusha, 1976), there is the following relationship among latitude α (plus toward the North Pole), solar altitude angle h (zero degree on the horizon, and plus toward the top of the Northern Hemisphere of the earth), solar azimuth angle A (zero degree at the due south, and plus toward the western side), hour angle t (angle of 15 degrees per an hour based on 24-hour cycle between the sun and the earth), and declination of the sun, β, (angle formed with equatorial plane of the earth. Minus 23 degrees, 27 minutes (−23° 27') at the winter solstice, 23 degrees, 27 minutes (23° 27') at the summer solstice, and zero degree at the spring equinox and the autumn equinox).

$$\sin h = \sin \alpha^* \sin \beta + \cos \alpha^* \cos \beta^* \cos t$$

$$\sin A = \cos \beta^* \sin t / \cos h$$

$$\cos A = (\sin h^* \sin \alpha - \sin \beta) / \cos h^* \cos \alpha$$

Also, according to page 7 of such book, hour angle t is as follows.

$$\text{Japan Standard Time} = t/15 - e - (\text{longitude} - 135)/15$$

The above "e" is called equation of time, and may, due to uneven speed of revolution of the earth throughout the year and inclination of plane of revolution of the earth and plane of the equator, be from 16.4 degrees to minus 14.3 degrees (page 7 of such book).

With the above formula and the (i) through (iv) calculation assumptions below, the following table is as a result of calculation of solar altitude angle h and solar azimuth angle A at the winter solstice in the central part of Tokyo (35 degrees, 41 minutes (35° 41') north latitude, 139 degrees, 46 minutes (139° 46') east longitude, time difference of 19.1 minutes, magnetic north difference of 6 degrees, 20 minutes (6° 20').
  (i) The equation of time "e" is disregarded.
  (ii) Times and directions of sunrise and sunset are theoretical ones (times and directions at the moment when the center of the sun passes the horizon), and, therefore, there are some differences from actual (meteorological) times of sunrise and sunset.
  (iii) Solar azimuth angle is directly treated as shade direction, and the due north is zero degree with minus to the west (in the morning) and plus to the east (in the afternoon).
  (iv) For altitude, angle is converted to shade ratio, which is the number of cos h.

TABLE 1

| Japan Standard Time | Shade Direction | Shade Ratio |
|---|---|---|
| 9 a.m. | −39.00 | 2.80 |
| 10 a.m. | −25.85 | 2.03 |
| 11 a.m. | −10.86 | 1.73 |
| Noon | 5.09 | 1.68 |
| 1 p.m. | 20.57 | 1.88 |
| 2 p.m. | 34.44 | 2.43 |
| 3 p.m. | 46.32 | 3.89 |

Figure 7:
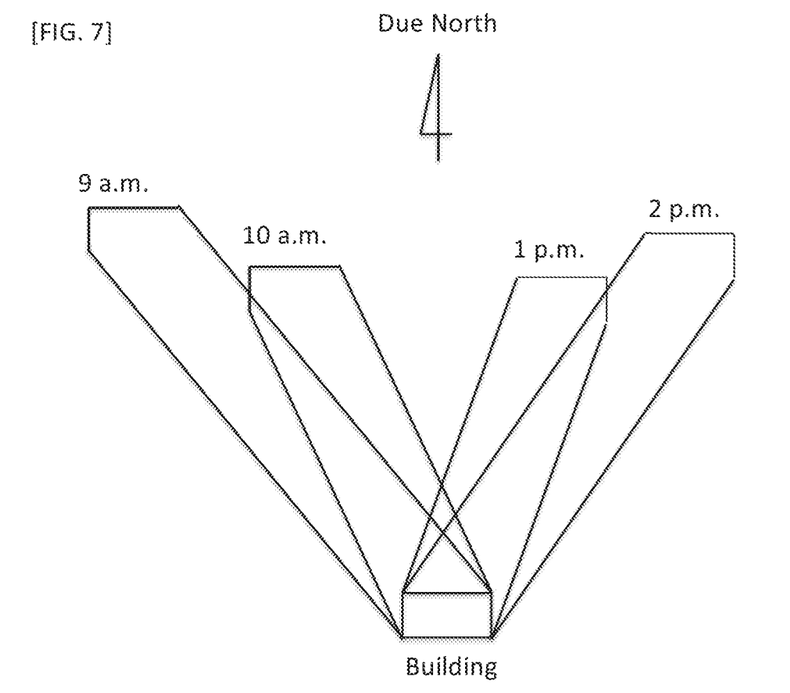
FIG. 7 is a sun shadow diagram regarding the specific times on the date of the winter solstice in the central part of Tokyo.

FIG. 7 (see page 8 of such book) is a sun shadow diagram regarding 9 a.m., 10 a.m., 1 p.m., and 2 p.m. based on the above and assuming that a building which causes shade is horizontal to the ground and that such building is a cuboid facing the due north, the short side length, long side length and height of which cuboid are 10 meters, 20 meters and 40 meters each.

For example, at 9 a.m., a shade by the northwest corner of the top surface of such building is on the place which (i) is 112 meters (such building height 40 meters*shade rate 2.80) apart from the cross point of the northwest corner of such building and the ground and (ii) is 39 degrees from the due north to the west.

Figure 8:
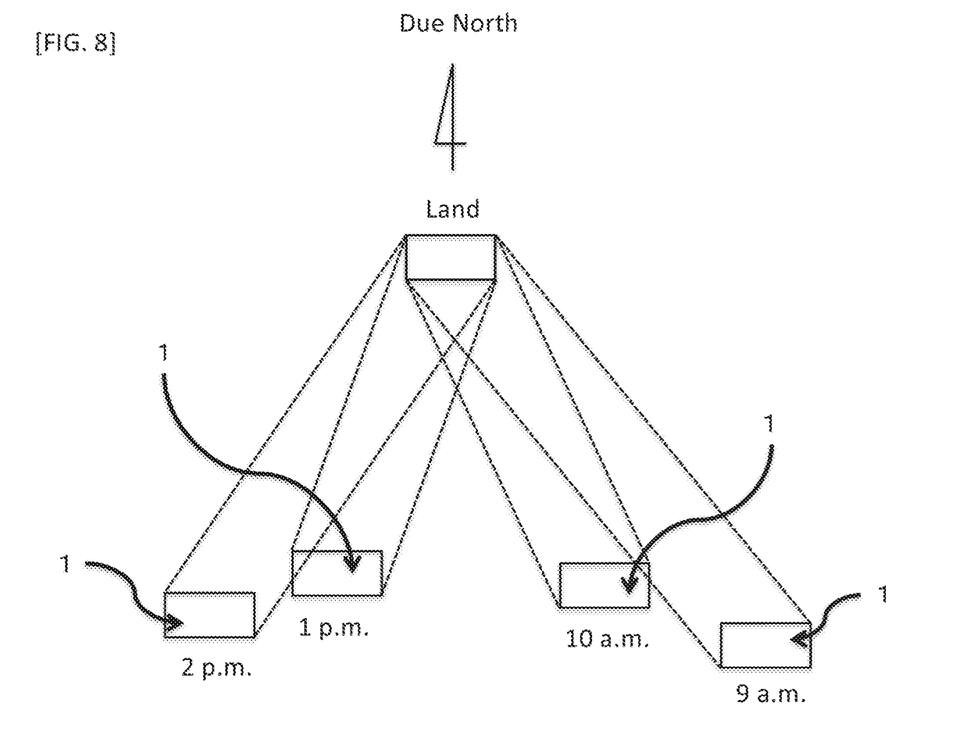
FIG. 8 is a figure to show relationship between a sheet and a land to be covered at the specific times on the date of the winter solstice in the central part of Tokyo.

On the other hand, since the above forms to execute this invention is to keep shading fixed tracts of land continuously regardless of passing of time, it is necessary that FIG. 7 is converted to FIG. 8 accordingly regarding 9 a.m., 10 a.m., 1 p.m., and 2 p.m., at the same place, date, and time assuming (i) that a land to be shaded whose short length and long length are 10 meters and 20 meters each and which faces the due north is put in the center and (ii) that a sheet having the same short length and long length is at 40 meters height horizontally to such ground.

For clarity, in the case of a sheet, a shade by the middle part of a building, which shade is seen in the sun shadow diagram of FIG. 7, is not created because there is an empty space between a sheet and the ground thereunder.

Also, while FIG. 8 shows designated positions of a sheet at the specific four times, it is possible to calculate designated positions (including heights) of a sheet between each of such specific four times.

Further, designated positions (including heights) of each flying object combined with a sheet are decided by calculating positions of each flying object and a sheet based on such designated positions (including heights) of a sheet.

For heights of a sheet, it is necessary to pay attention not to disturb sports or events played or held on a land to be covered physically, visually or by noises made by flying objects.

For clarity, it is thought in theory that the same size of shade is created by a smaller size of sheet by such sheet being closer to the light source, the sun, (i.e., by getting heights of such sheet higher), but, since there is too much distance from the light source, the sun, it cannot make a meaningful difference to somewhat increase heights of a sheet.

For calculation of designated positions of each flying object, in addition to the above method, it is thought that they are decided based on (i) a distance from a cross point of (a) a line segment between the center or the gravity center of a land to be covered and the sun and (b) a horizontal plane at the height where flying objects are flying, and (ii) a distance from the other flying objects combined with a sheet.

Further, as another form to execute this invention, it is thought that horizontal positions of flying objects are adjusted by (i) checking, through cameras affixed to flying objects, whether a land to be covered, such as school yard or athletics stadium, is being shaded by a sheet and (ii) thereafter comparing such shade with a position of a land to be covered, which position is recognized through cameras similarly.

While the above assumes that a surface formed by a sheet is horizontal to the ground, it is also thought that sizes of shade created on the ground are adjusted by (i) some of flying objects combined with a sheet flying at different heights from those of the other flying objects which are also combined with such sheet and (ii) keeping a surface formed by a sheet in positions not horizontal to the ground.

Also in this case, positions of flying objects can be adjusted by the above formula.

In such case, a size of shade created on the ground may vary on that of a sheet, like in the case where a surface formed by a sheet is horizontal to the ground.

While the above-mentioned FIG. 6 assumes that a person, as a controller, operates a separate mobile device, since, as mentioned above, designated positions (including heights) of a sheet at a specific date, time, and place are decided in advance, it is also thought that:
  (i) Information for such designated positions (including heights) are pre-installed into a separate mobile device; and
  (ii) Such separate mobile device (a) automatically instructs each of flying objects combined with a sheet to fly in designated positions (including heights) at the date, time and place, checking information of current positions transmitted from flying objects, and (b) thereafter continuously provides instructions to hover or move depending on designated positions (including heights) which change as time proceeds.

Figure 9:
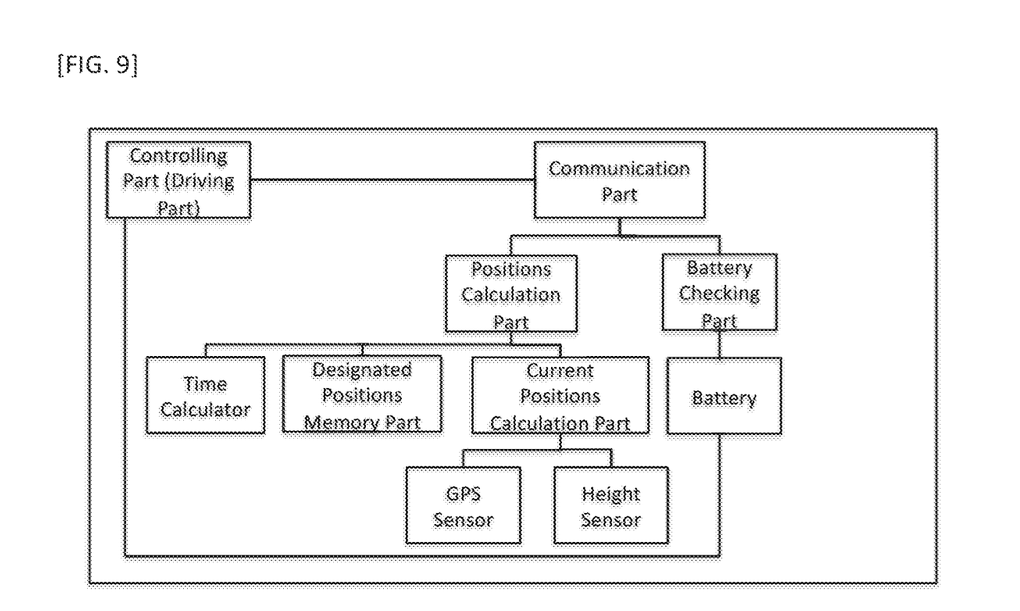
FIG. 9 is a figure to show an example of a structure of an inside of a flying object in a different form to execute this invention (self-controlled flying form).

Further, as FIG. 9, it is also thought that each of flying objects combined with a sheet incorporates memory part as well as time calculator into the inside of it, such memory part memorizes such information designated positions (including heights), and such flying objects by themselves autonomously:
  (i) Fly to designated positions (including heights) at the date, time, and place, comparing, in its inside, then-current positions (including heights) with designated positions (including heights); and (ii) Thereafter change their positions (including heights) gradually to match such positions to designated positions (including heights) which change as time proceeds.

In the case of the above-mentioned automatic flying or autonomic flying, when a flying object shall return, its designated position at the time has to be a position (including height) of a land where such flying object shall land.

For clarity, since a designated position (including height) of each of flying objects combined with the same sheet is different from the other flying object(s), designated positions (including heights) shall be calculated respectively for each of flying objects.

Figure 10:
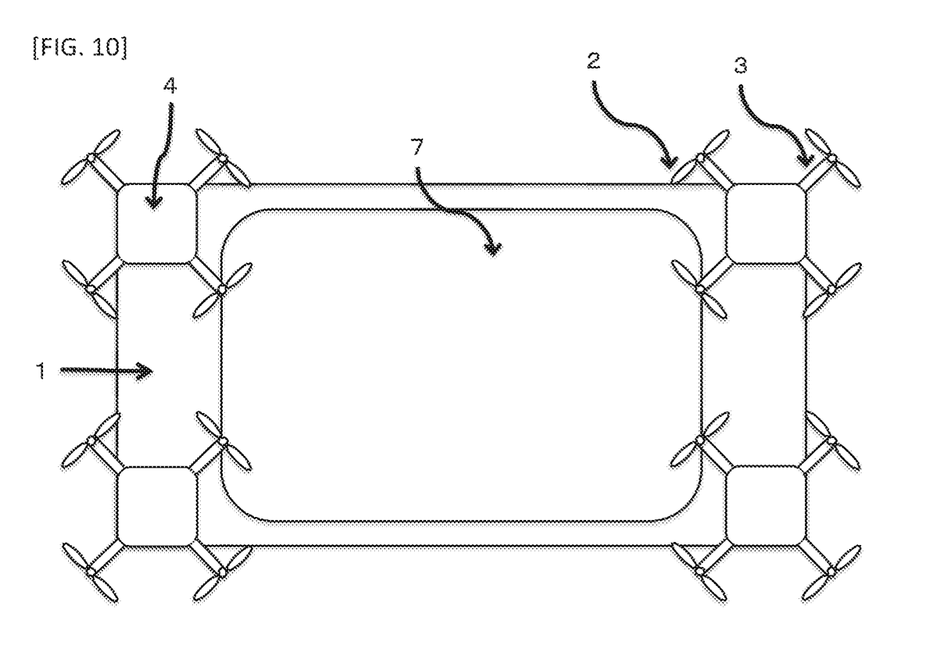
FIG. 10 is a figure of a view from the above of an example of a structure of a flying object in a different form to execute this invention (solar-cell using form).

As a variation of the above forms to execute this invention, it is also thought, as in FIG. 10, that solar cells or modules are incorporated into a sheet, and electric powers generated therefrom are stored at a battery.

Figure 11:
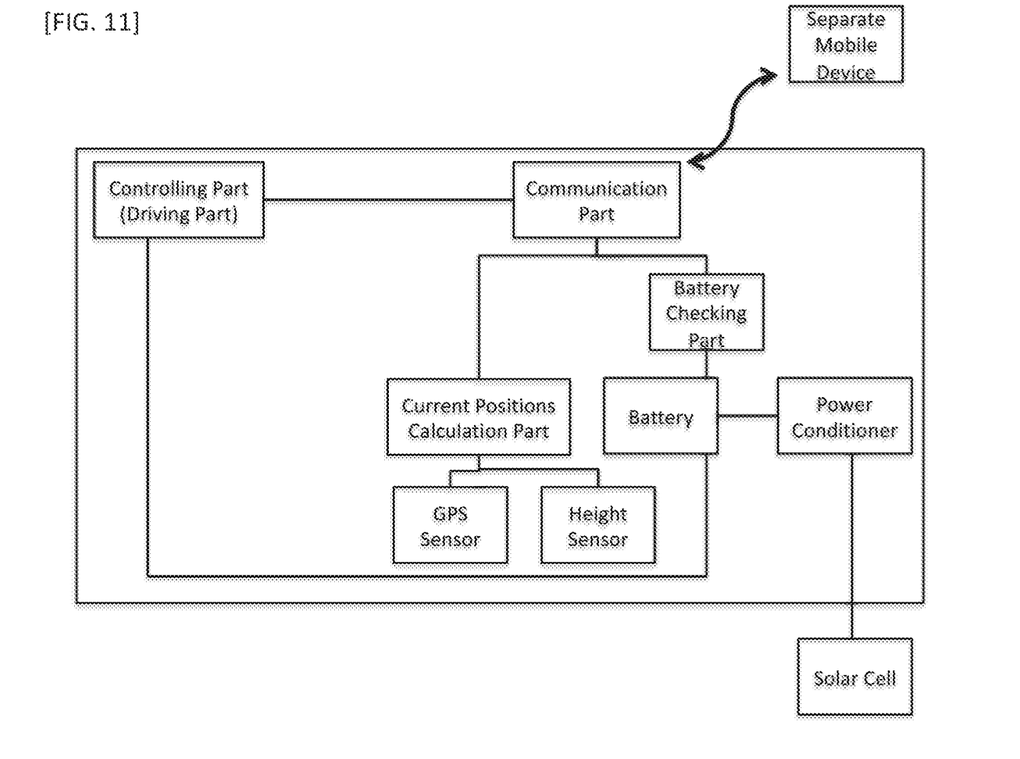
FIG. 11 is a figure to show an example of a structure of an inside of a flying object in a different form to execute this invention (solar-cell using form).

FIG. 11 shows a structure of a flying object in the event that the solar power generation is introduced into the form in FIG. 6 to execute this invention.

Figure 12:
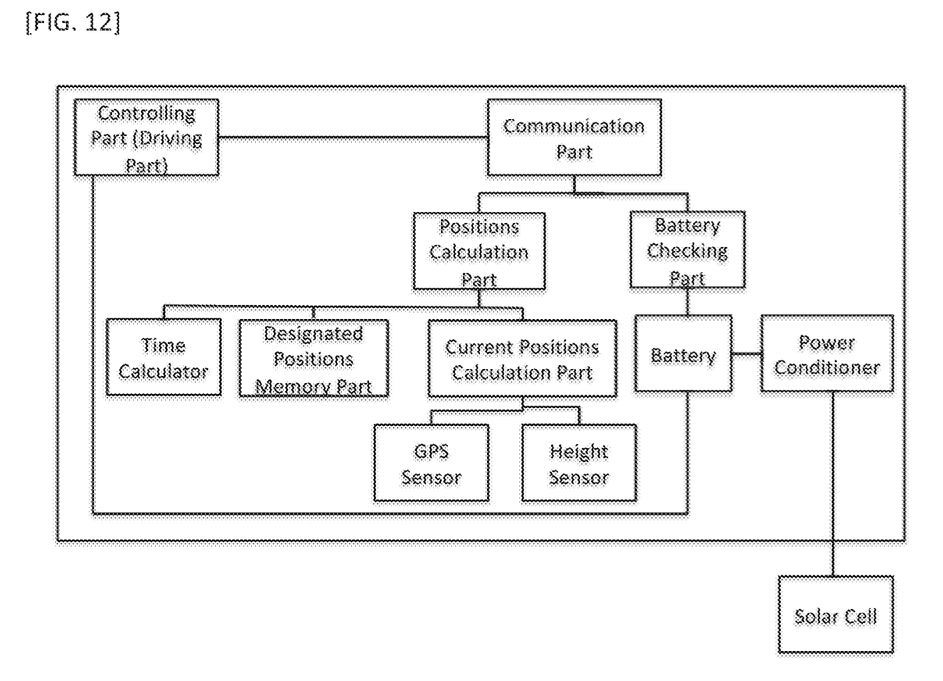
FIG. 12 is a figure to show an example of a structure of an inside of a flying abject in a different form to execute this invention (self-controlled flying and solar-cell using form).

Also, FIG. 12 shows a structure of a flying object in the event that the solar power generation is introduced into the form in FIG. 9 to execute this invention.

Both in FIG. 11 and FIG. 12, a power conditioner is between a battery and solar cells in order for such battery to store electric powers generated from solar cells or modules, as alternation current.

Also, as another variation, it is thought that a surface formed in the air by multiple flying objects and a sheet is used as a screen to be seen by people on the ground at night, not for shading.

For example, it is thought that images of stars are projected onto such screen, and people, from the ground, enjoy starry-sky-like images on such screen.

On the other hand, it is also thought that advertisements, such as company logos, etc., are put on a sheet itself.

Further, not only persons but also lands which need to be protected from excessive dry weather may be an object to be protected with a surface formed by multiple flying objects and a sheet fixed thereto.

The above-mentioned forms to execute this invention are not exhaustive, and thus it is possible that this invention is executed in different forms from such above-mentioned forms within the scope of this invention identified by claims of this invention.

Also, even if, in this detailed description of the invention, any element of this invention is explained in singular form, in plural form, or in non-sensitive form to distinction between singular and plural, such element(s) may be either singular or plural unless the context requires another interpretation.

DESCRIPTION OF THE REFERENCE NUMERALS

1: Sheet
2: Propeller
3: Arm
4: Body Part
5: Surrounding Part
6: String-like or pole-like material
7: Solar cell or module

The invention claimed is:

1. A method to create, on a fixed tract of land, shade of the same size and shape as such land,
   with a step to have multiple drones connected with each other through a sheet, whose size and shape are the same as those of such shade, (i) fly to a first position at a first time and (ii) hover at the first position so that such sheet is horizontal to such land; and
   a step to (i) have flying positions of such multiple drones change from the first position to a second position at a second time while keeping such sheet horizontal to such land, and (ii) have such multiple drones hover at the second position so that such sheet is horizontal to such land,
   propellers of which multiple drones are within outer edges of such multiple drones,
   which sheet is connected with such multiple drones so that such sheet and such multiple drones are horizontal to such land,
   which first position is a position in the troposphere (i) where shade created by such sheet on such land matches such land at the first time, and (ii) which position is decided based on date, latitude and longitude of such land, and flying height of such multiple drones,
   which second position is a position in the troposphere (i) where shade created by such sheet on such land matches such land at the second time and (ii) which position is decided based on date, latitude and longitude of such land, and flying height of such multiple drones, and
   a character of which method is to continue to create, only on such land, shade of the same size and shape as such land despite of change of positional relationship between the sun and such land due to passage of time.

2. The method of claim 1, wherein an additional drone or additional drones propellers of which additional drone(s) are within outer edges of such additional drone(s), is/are connected with inside edges of such sheet so that such sheet and such additional drone(s) are horizontal to the fixed tract of land.

* * * * *